United States Patent
Whang et al.

(10) Patent No.: US 11,798,026 B2
(45) Date of Patent: Oct. 24, 2023

(54) METHOD FOR EVALUATING ADVERTISING EFFECTS OF VIDEO CONTENT AND SYSTEM FOR APPLYING THE SAME

(71) Applicant: SANGMYUNG UNIVERSITY INDUSTRY-ACADEMY COOPERATION FOUNDATION, Seoul (KR)

(72) Inventors: Min Cheol Whang, Goyang-si (KR); A Young Cho, Goyang-si (KR); Hyun Woo Lee, Gyeonggi-do (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 288 days.

(21) Appl. No.: 17/393,064

(22) Filed: Aug. 3, 2021

(65) Prior Publication Data
US 2022/0270130 A1  Aug. 25, 2022

(30) Foreign Application Priority Data
Feb. 19, 2021 (KR) .......................... 10-2021-0022601

(51) Int. Cl.
G06Q 30/0242 (2023.01)
G06T 7/246 (2017.01)
(Continued)

(52) U.S. Cl.
CPC ......... *G06Q 30/0246* (2013.01); *G06F 18/22* (2023.01); *G06T 7/246* (2017.01);
(Continued)

(58) Field of Classification Search
CPC .... G06F 18/22; G06V 40/161; G06V 40/171; G06V 40/176; G06V 40/168;
(Continued)

(56) References Cited

U.S. PATENT DOCUMENTS 10,207,405 B2 *  2/2019  Shaw ....................... A63F 13/56
11,335,069 B1 *  5/2022  Savchenkov .......... G06N 20/00
(Continued)

FOREIGN PATENT DOCUMENTS

JP  2014-006639 A  1/2014
KR  20130022165 A  3/2013
(Continued)

OTHER PUBLICATIONS

Pham et al. "Understanding Emotional Responses to Mobile Video Advertisements via Physiological Signal Sensing and Facial Expression " Mar. 2017; AnalysisIUI '17: Proceedings of the 22nd International Conference on Intelligent User Interfaces , pp. 67-78 (Year: 2017).*

(Continued)

*Primary Examiner* — Wesley J Tucker
(74) *Attorney, Agent, or Firm* — Panitch Schwarze Belisario & Nadel LLP

(57) ABSTRACT

The disclosure is related to a method and system for evaluating advertising effects of video content. The evaluation method includes presenting video content including a character to a viewer through a display, extracting pieces of facial micro-movement data (MMD) of the character in the video content and the viewer, while the viewer watches the video content, calculating a similarity of the MMD of the character and the MMD of the viewer, and calculating an advertising effect score of the video content on the basis of the similarity.

20 Claims, 7 Drawing Sheets

(51) Int. Cl.
  *G06V 20/40* (2022.01)
  *G06V 40/16* (2022.01)
  *G06F 18/22* (2023.01)

(52) U.S. Cl.
  CPC ............ *G06V 20/46* (2022.01); *G06V 40/161* (2022.01); *G06V 40/171* (2022.01); *G06V 40/176* (2022.01); *G06T 2207/10016* (2013.01); *G06T 2207/30201* (2013.01)

(58) Field of Classification Search
  CPC ................ G06V 40/172; G06V 40/174; G06T 2207/10016; G06T 2207/30201; G06Q 30/0242
  See application file for complete search history.

(56) References Cited

U.S. PATENT DOCUMENTS

| | | | | |
|---|---|---|---|---|
| 11,581,020 | B1* | 2/2023 | Hadap | G11B 27/036 |
| 2008/0060033 | A1* | 3/2008 | Xiao | G06V 40/174 |
| | | | | 348/E7.079 |
| 2013/0147788 | A1* | 6/2013 | Weise | G06V 10/7715 |
| | | | | 345/419 |
| 2015/0356347 | A1* | 12/2015 | Egerton | G06V 40/166 |
| | | | | 345/473 |
| 2017/0053663 | A1* | 2/2017 | Yu | G06T 13/40 |
| 2018/0075483 | A1* | 3/2018 | Boyarshinov | G06Q 30/0255 |
| 2019/0087870 | A1* | 3/2019 | Gardyne | H04N 21/2743 |
| 2020/0219295 | A1* | 7/2020 | el Kaliouby | G06T 11/00 |
| 2021/0264139 | A1* | 8/2021 | Fortune | G06V 40/171 |
| 2022/0245963 | A1* | 8/2022 | Embrechts | G06V 40/20 |
| 2022/0319060 | A1* | 10/2022 | Marinenko | G06Q 30/0276 |

FOREIGN PATENT DOCUMENTS

| | | |
|---|---|---|
| KR | 102215557 B1 | 2/2021 |
| WO | 2017064891 A1 | 4/2017 |

OTHER PUBLICATIONS

Balakrishnan, Guha, et al., "Detecting Pulse from Head Motions in Video", 2013 IEEE Conference on Computer Vision and Pattern Recognition, 2013, pp. 3430-3437 (8 pages).
Blackshaw, Pete, et al., "Consumer-Generated Media (CGM) 101: Word-of-Mouth in the Age of the Web-Fortified Consumer", 2006, 13 pages.
Bollen, Kenneth A., et al., "Detection and Determinants of Bias in Subjective Measures*", American Sociological Review, 1998, vol. 63, No. 3, pp. 465-478, downloaded from http://www.jstor.org/stable/2657559 (15 pages).
Bouguet, Jean-Yves, "Pyramidal Implementation of the Lucas Kanade Feature Tracker Description of the algorithm", Intel Corporation, Microprocessor Research Labs, 9 pages.
Constantinides, Efthymios, et al., "Special Issue Papers Web 2.0: Conceptual foundations and marketing issues", Journal of Direct, Data and Digital Marketing Practice; vol. 9, No. 3, pp. 231-244 (14 pages).
Dimpfel, Wilfried, "Neuromarketing: Neurocode-Tracking in Combination with Eye-Tracking for Quantitative Objective Assessment of TV Commercials", Journal of Behavioral and Brain Science, Apr. 2015, vol. 5, No. 4, pp. 137-147 (11 pages).
Ferreira, Leonardo G., et al., "Molecular Docking and Structure-Based Drug Design Strategies", Mollecules, 2015, vol. 20, vol. 7, pp. 13384-13421 (18 pages).
Jahedi, Salar, et al., "On the advantages and disadvantages of subjective measures", Journal of Economic Behavior & Organization, Feb. 2014, vol. 98, pp. 97-114 (18 pages).
Lee, Hyunwoo, et al., "Vision-Based Measurement of Heart Rate from Ballistocardiographic Head Movements Using Unsupervised Clustering", Sensors, 2019, vol. 19, No. 15, 3263, 16 pages.
Liu, Weifeng, et al., "Correntropy: A Localized Similarity Measure", 2006 International Joint Conference on Neural Networks, 2006, pp. 4919-4924(6 pages).
Pannucci, Christopher J., et al., "Identifying and Avoiding Bias in Research", American Society of Plastic Surgeons, Aug. 2010, vol. 126, No. 2, pp. 619-625 (7 pages).
Shan, Li, "Video-based Heart Rate Measurement Using Head Motion Tracking and ICA", 2013 6th International Congress on Image and Signal Processing (CISP), 2013, pp. 160-164 (5 pages).
Ungureanu, T., et al., "Spatial distribution and geochemistry of heavy metals in soils: A case study from the NE area of Vaslui county, Romania", Journal of Geochemical Exploration, Aug. 2016, vol. 176, pp. 20-32 (14 pages).
Viola, Paul, et al., "Rapid Object Detection Using a Boosted Cascade of Simple Features", Proceedings of the 2001 IEEE Computer Society Conference on Computer Vision and Pattern Recognition 2001, pp. 1-511-1-518 (8 pages).
Zamani, H., et al., "Eye Tracking Application on Emotion Analysis for Marketing Strategy", Journal of Telecommunication, Electronic and Computer Engineering, vol. 8, No. 11, pp. 87-91 (5 pages).
Korean Office Action dated Nov. 16, 2022, corresponding to KR-10-2021-0022601 with English Translation (13 Pages).

* cited by examiner

METHOD FOR EVALUATING ADVERTISING EFFECTS OF VIDEO CONTENT AND SYSTEM FOR APPLYING THE SAME

CROSS-REFERENCE TO RELATED APPLICATION

This application is based on and claims priority under 35 U.S.C. § 119 to Korean Patent Application No. 10-2021-0022601, filed on Feb. 19, 2021, in the Korean Intellectual Property Office, the disclosure of which is incorporated by reference herein in its entirety.

BACKGROUND

1. Field

The present disclosure relates to a method for evaluating advertising effects of video content and a system for applying the same, and more particularly, to a method and system for evaluating advertising effects of video content based on evaluation on similarity of micro-movements of a viewer relative to the video content.

2. Description of the Related Art

As a social media platform emerges as a major content consumption platform, the influence of users becomes important for advertising effects associated with content However, a scheme for measuring the advertising effects associated with the content largely depends on a survey in which questions are directly asked to viewers and answered therefrom. Such a survey scheme requires investment of high cost of resources, since it is necessary to collect participants answering the survey.

Despite of the measurement with a large amount of investment of resources, it may result in response bias, inconsistency, and unpredictability due to the integrity and subjective purposes of respondents. Accordingly, it is required to provide a method for recognizing the advertising effects associated with content automatically and quantitatively.

To this end, neuromarketing researches, which track user gaze and analyze a product of interest, are actively progressed. However, since it requires separate tracking equipment for gaze tracking, and the subjective and empirical judgment of the viewer may be largely involved in information according to the conscious gaze of the viewer, the measurement according to the gaze is ambiguous and inaccurate.

Accordingly, it is necessary to study a method for evaluating genuinely an advertising video without causing inconvenience to the user.

SUMMARY

The disclosure provides a method and system for evaluating whether a viewer empathizes with advertising content, and evaluating advertising effects therethrough.

According to the disclosure, an unconscious reaction of a viewer to the advertising content is recognized, and whether the viewer empathizes with the advertising content is evaluated as the advertising effects on the basis of such an unconscious reaction.

The disclosure provides a method and system for recognizing an unconscious reaction of a viewer from facial micro-movements of the viewer, and evaluating advertising effects of advertising content using the same.

A method for evaluating advertising effects of video content according to the present disclosure may include:
presenting video content including a character to a viewer through a display;
extracting pieces of facial micro-movement data (MMD) of the character in the video content and the viewer, while the viewer watches the video content;
calculating a similarity of the MMD of the character and the MMD of the viewer;
and calculating an advertising effect score of the video content on the basis of the similarity.

According to one or more embodiments, the extracting of the pieces of facial MMD may include:

According to one or more embodiments, the extracting of the pieces of facial MMD may include:
selecting, from the face areas, regions of interest (ROI) from which facial micro-movements are to be extracted;
extracting a plurality of landmarks from the ROI;
tracking movements of the landmarks to extract landmark movement data;
and calculating MMD having representative periodicity from the landmark movement data.

According to one or more embodiments, the ROI may be defined as at least one between a nose area and a forehead area of a face.

According to one or more embodiments, a Kanade-Lucas-Tomasi (KLT) tracking algorithm may be applied to the tracking of the landmarks to calculate the movements of the landmarks.

In order to extract unconscious micro movement signal from the movements of the landmarks, the landmark movement data may be filtered at a prescribed frequency, and MMD may be extracted which expresses periodicity of a heart rate through principal component analysis (PCA) to the filtered landmark movement data.

According to one or more embodiments, the calculating of the similarity may further include a preprocessing step for filtering the MMD with a band pass filter in frequencies about 0.75 Hz to about 2.5 Hz.

According to one or more embodiments, the pieces of MMD of the character and viewer may be transformed to time-series power spectral densities (PSDs) of the character and the viewer through fast Fourier transform (FFT), and a similarity of the character's MMD and the viewer's MMD is calculated by cross-entropy H(p, q) defined as the following equation (1), $$H(p, q) = -\sum_x p(x)\log q(x) \quad \langle \text{Equation 1}\rangle$$
$$= -(p(x)\cdot \log q(x) + (1 - p(x))\cdot \log(1 - q(x)))$$

where p denotes the PSD of the character, q denotes the PSD of the viewer, p(x) denotes a value of an amplitude at frequency "x" (Hz) in the character's PSD, and q(x) denotes a value of an amplitude at frequency "x" (Hz) in the viewer's PSD.

According to one or more embodiments, subject evaluation of the viewer may be performed on the video content to calculate a subjective evaluation score of the viewer, and the advertising effect score y' may be calculated with the following equation (2), $$y' = a \times x + \bar{y} - \bar{x}a \qquad \text{(Equation 2)}$$

$$a = \frac{n\sum xy - \sum x \sum y}{n\sum x^2 - (\sum x)^2}$$

where x denotes the similarity of MMD, y denotes the subjective evaluation score, n denotes the number of subjective evaluation people, $\bar{x}$ is an average of x, and $\bar{y}$ is an average of y.

A system for evaluating advertising effects of video content performing the method according to the present disclosure includes:
- a display configured to display video content including a character to a viewer;
- a camera configured to capture a face of the viewer;
- an image capturing unit configured to capture the video content;
- an image analysis unit configured to extract face areas of the character and the viewer from the images from the camera and the image capturing unit;
- a micro-movement analysis unit configured to extract respective pieces of facial micro-movement data (MMD) from the face areas of the character and the viewer, and analyze a similarity of the pieces of MMD of the character and the viewer; and
- an advertising evaluation unit configured to evaluate advertising effects on the basis of the similarity.

In the system for evaluating advertising effects of video content according to one or more embodiments, the micro-movement analysis unit may be configured to filter the MMD with a band pass filter (BPF) in frequencies about 0.75 Hz to about 2.5 Hz in the calculating of the similarity.

In the system for evaluating advertising effects of video content according to one or more embodiments, the micro-movement analysis unit may
- transform the pieces of MMD of the character and viewer to time-series power spectral densities (PSDs) of the character and the viewer through fast Fourier transform (FFT), and
- calculate a similarity of the character's MMD and the viewer's MMD through cross-entropy H(p, q) defined as the following equation (3), $$H(p, q) = -\sum_x p(x)\log q(x) \qquad \text{(Equation 3)}$$
$$= -(p(x) \cdot \log q(x) + (1 - p(x)) \cdot \log(1 - q(x)))$$

where p denotes the character's PSD, q denotes the viewer's PSD, p(x) denotes a value of an amplitude at frequency "x" (Hz) in the character's PSD, and q(x) denotes a value of an amplitude at frequency "x" (Hz) in the viewer's PSD.

According to one or more embodiments, the advertising evaluation unit may perform subject evaluation of the viewer on the video content to calculate a subjective evaluation score of the viewer, and the advertising effect score y' may be calculated with the following equation (4), $$y' = a \times x + \bar{y} - \bar{x}a \qquad \text{(Equation 4)}$$

$$a = \frac{n\sum xy - \sum x \sum y}{n\sum x^2 - (\sum x)^2}$$

where x denotes the similarity of MMD, y denotes the subjective evaluation score, n denotes the number of subjective evaluation people, $\bar{x}$ is an average of x, and $\bar{y}$ is an average of y.

According to one or more embodiments, the advertising evaluation unit may calculate prediction accuracy of advertising effects of the advertising video by subtracting, from 100%, a mean absolute percentage error (MAPE) calculated by the following equation (5), $$MAPE(\%) = \frac{100}{n} \sum_{x=1}^{n} \left| \frac{A_x - F_x}{A_x} \right| \qquad \text{(Equation 5)}$$

where $A_x$ denotes a subjective evaluation score, $F_x$ denotes a prediction value, and n denotes total number of samples (number of people*number of videos).

Additional aspects will be set forth in part in the description which follows and, in part, will be apparent from the description, or may be learned by practice of the presented embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
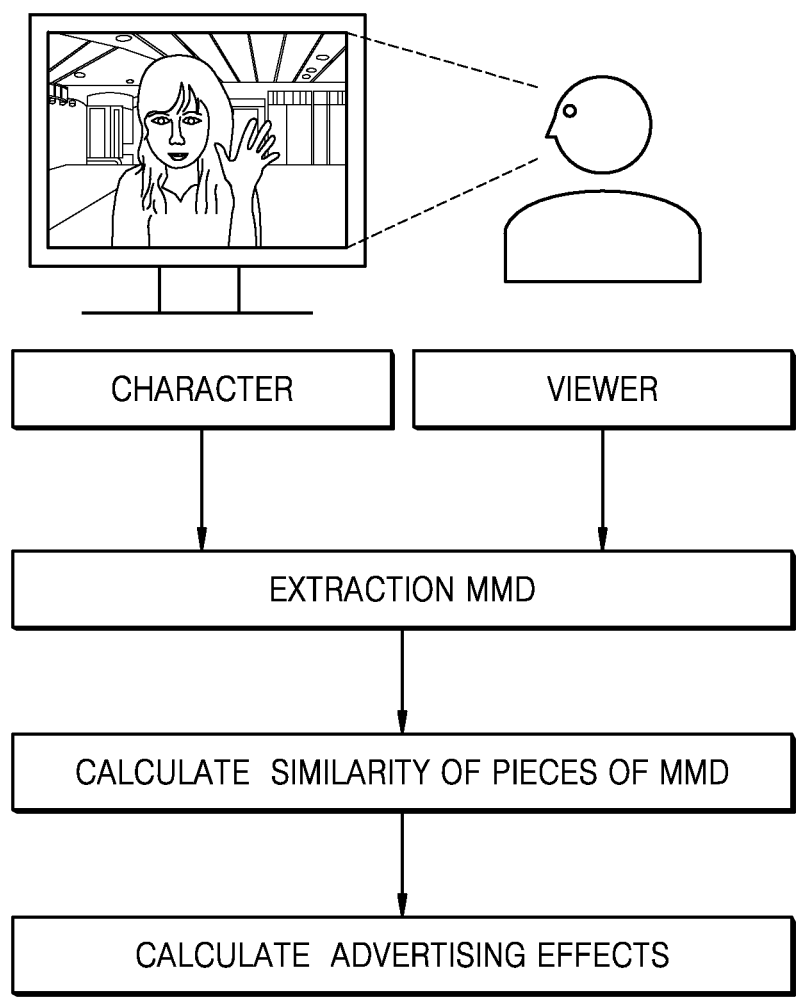
FIG. 1 is a schematic flowchart of a method for evaluating advertising effects of video content according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, preferred embodiments of the present invention will be described in detail with reference to the accompanying drawings. However, the embodiments of the disclosure may be modified into various other forms, and the scope of the present invention should not be construed as being limited by the embodiments described below. Embodiments of the disclosure are desirably interpreted to provide a more complete understanding of the disclosure to those skilled in the art. The same reference numerals denote the same elements at all times. Further, various elements and regions in the drawings are schematically drawn. Accordingly, the disclosure is not limited by the relative size or spacing depicted in the accompanying drawings.

The terms first, second, etc. may be used to describe various components, but the components are not limited by the terms. The terms are used only for the purpose of distinguishing one component from another. For example, without departing from the scope of the present invention, the first component may be referred to as a second component, and conversely, the second component may be referred to as a first component.

The terminology used herein is for the purpose of describing particular embodiments only and is not intended to limit the disclosure. The singular expressions include plural expressions unless the context clearly dictates otherwise. In this application, the expressions "comprising" or "having", etc. are intended to specify the presence of stated features, integers, steps, operations, elements, parts, or combinations thereof. It is to be understood that the invention does not preclude the presence or addition of one or more other features, integers, operations, components, parts, or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

An embodiment according to the disclosure measures a similarity of micro-movements of the face of a character appearing in video content and the face of a viewer who views the video content, and evaluates advertising effects using the same.

FIG. 1 is a schematic flowchart of a method for evaluating advertising effects according to the disclosure.

Referring to FIG. 1, pieces of micro-movement data (MMD) are extracted from facial micro-movements of a character in advertising content in which the character appears and a viewer who watches the advertising content, the pieces of MMD are analyzed to calculate the similarity of the two pieces of MMD, and degrees of the advertising effects or whether the advertising is effective is evaluated on the basis of the similarity. In the above process it is required to image the face of the viewer who watches the advertising content by means of a video camera in order to extract facial micro-movements from the viewer.

Figure 2:
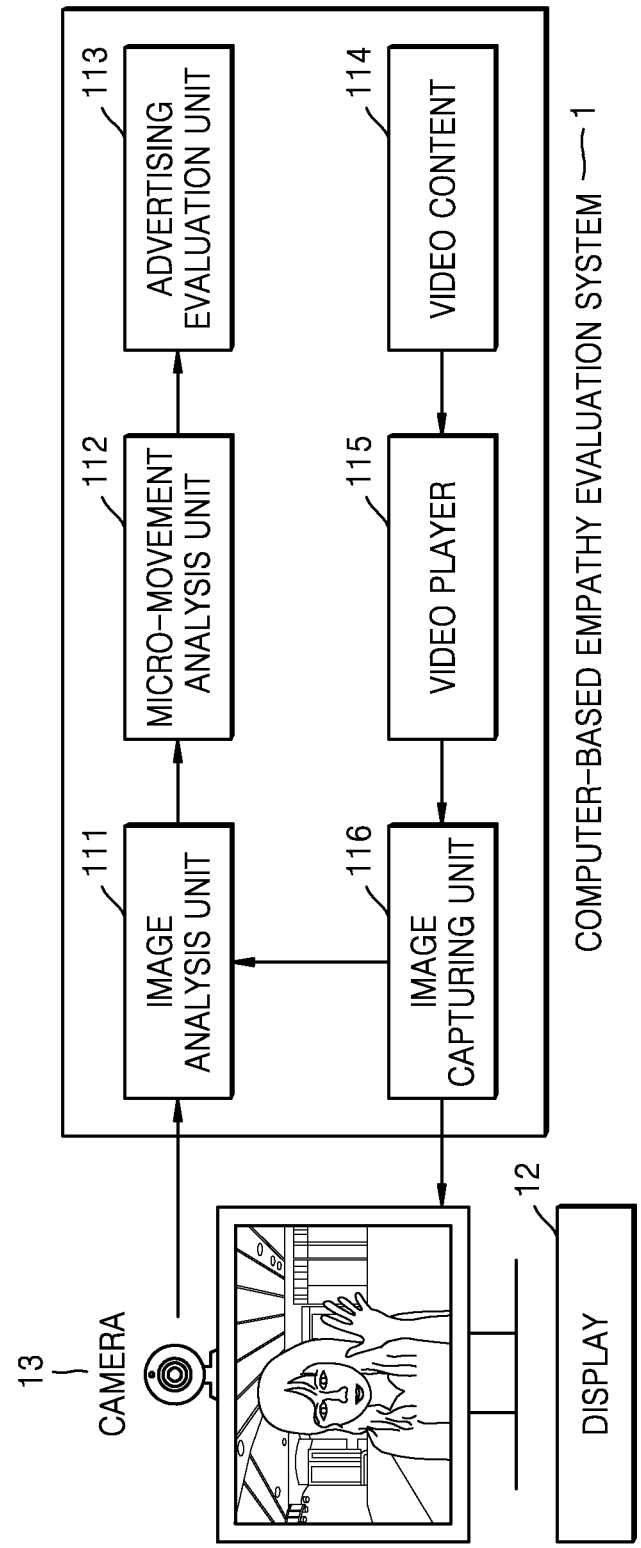
FIG. 2 is a block diagram showing a schematic configuration of a system for evaluating advertising effects of video content according to one or more embodiments.

FIG. 2 is a schematic block diagram of a system 11 for evaluating advertising effects according to the disclosure.

The advertising effect evaluation system 11 acquires a face image of the viewer 20 while showing the viewer 20 video content 114 including an image of a person (i.e., the character), and determines whether the facial micro-movements of the viewer 20 is generated similarly to facial micro-movements of the character appearing in the video content to evaluate the degrees of the advertising effects or whether the advertising is effective.

In detail, the system 11 for evaluating advertising effects includes a hardware structure based on a computer system including an input and output devices such as a keyboard, a mouth, and a display 12, and a main board to which the input and output devices are connected.

The hardware may be implemented by a system dedicated according to another embodiment of the disclosure. The technical scope of such an empathy evaluation device is not limited by a specific hardware system.

More specifically, the system 11 for evaluating advertising effects may include a video camera 13, such as a webcam, or a web camera, for imaging the face of the viewer 20. In addition, such a system 1 processes face images of the character in the video content 114 and the viewer 20 who watches the same through an analysis algorithm provided in a software type, and evaluates the degrees of the advertising effects or whether the advertising is effective using the processed result.

As shown in FIG. 2, the display device 12 and the camera 13 face toward the viewer 20. The display device 12 is a device configured to show the viewer 20 the video content 114. The camera 13 images the face of the viewer 20 who watches the video content 114 to record facial expressions and movements reacting to the video content 114.

A computer-based empathy evaluation system 1 to which the camera 13 and the display 12 are connected includes a video player 115 configured to replay the video content 114 and an image capturing unit 116 configured to capture images transmitted frame-by-frame to the display device 12 from the video player 115. Here, content images captured by the image capturing unit 116 is to be compared with the face image of the viewer 20 imaged by the camera 13.

A character to which the viewer 20 may emotionally react is included in the video content 114, and facial micro-movements of the character are extracted from the captured content image.

The image analysis unit 111 analyzes the face image of the character, which is the captured image, and the face image of the viewer to extract pieces of MMD of the both of them. The pieces of MMD include micro-movement components related to heart data.

A micro-movement analysis unit 112 analyzes the pieces of MMD to measure or calculate a similarity in micro-movements, the similarity indicating whether the viewer 20 emotionally empathizes with emotion expressed by the character.

According to the similarity result, an advertising evaluation unit 113 determines whether the viewer empathizes with the emotion expressed by the character according to the analyzed similarity result from the micro-movement analysis unit 112 to determine the degrees of the advertising effects or whether the advertising is effective.

In the above-described, the image analysis unit, the micro-movement analysis unit, and the advertising evaluation unit may be provided through an analysis algorithm provided in a software form.

I. Micro-Movement Data (MMD) Extraction

Figure 3:
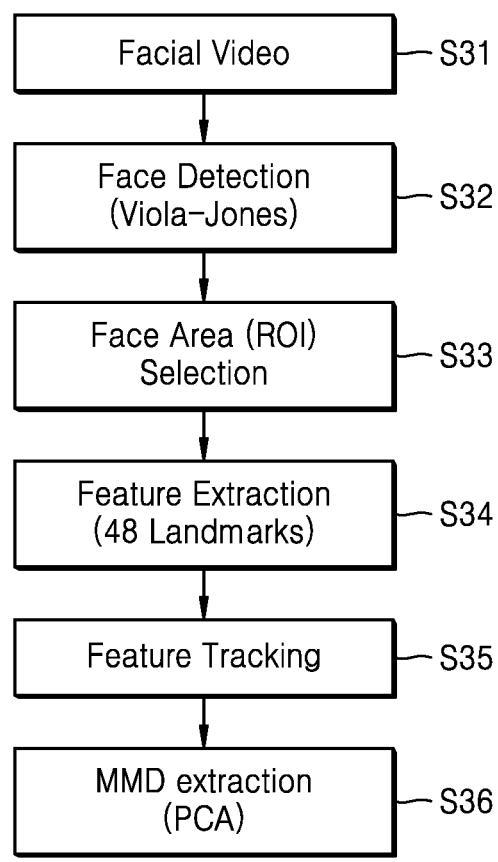
FIG. 3 is a flowchart of a process for extracting facial micro-movement data (MMD) in a method for evaluating advertising effects of video content according to one or more embodiments.
Figure 4:
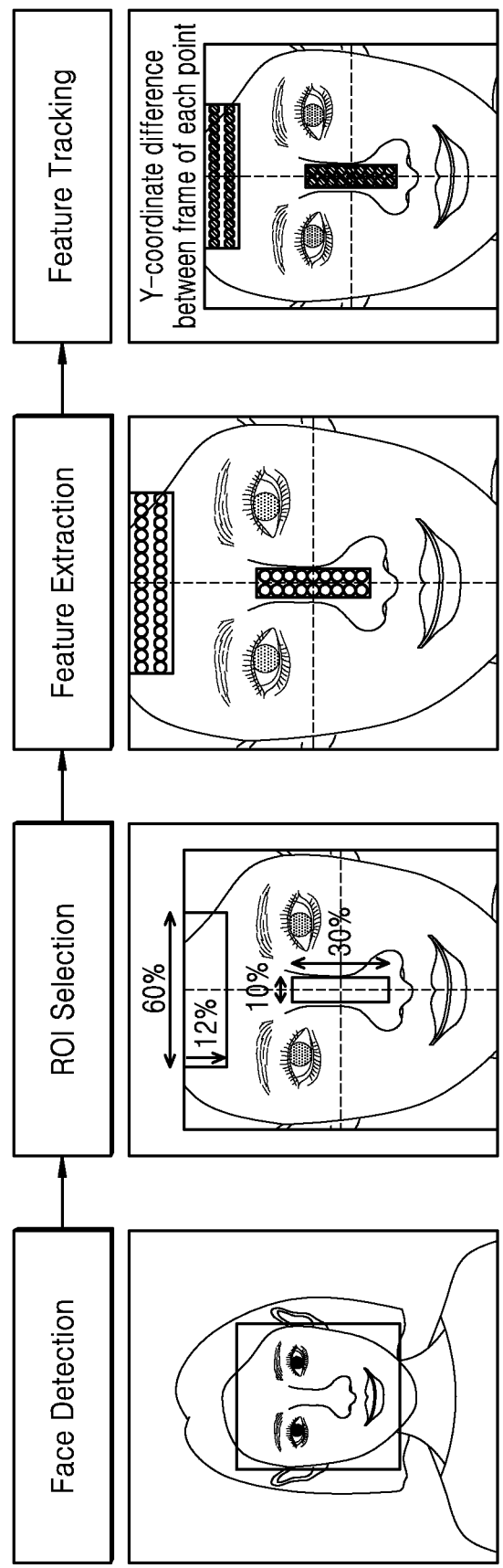
FIG. 4 shows stepwise views of a signal processing area in facial video in a step for extracting a feature unit from the facial video in the process shown in FIG. 3.

FIG. 3 illustrates a process of extracting MMD, which is evaluation data for evaluating the above-described degrees of the advertising effects or whether the advertising is effective, and FIG. 4 illustrates a process for detecting faces of the captured viewer and character to a process for tracking a facial feature.

I-1. Facial Video Acquisition (Step S31)

Face images of the character and the viewer are acquired from capturing the advertising content and imaging the face of the viewer.

I-2. Face Detection (Step S32)

As shown in (A) of FIG. 4, the areas in which the faces of the character and the viewer are included are detected from the captured image and the imaged viewer's image. The extraction of the face areas is performed by applying such as a Viola-Jones algorithm using the feature of light and shade, or a method of histogram of oriented gradients (HOG).

I-3. Face Area Selection (Step S33)

As shown in (B) of FIG. 4, the forehead and the nose are parts least affected by facial expression than other face parts, and thus forehead and nose areas are designated as regions of interest (ROI) in order to minimize noises due to the expression. The forehead area is designated as a detailed ROI corresponding to 60% of the lateral width on the basis of the center of the face area and 12% of the vertical width on the basis of an upper side, and the nose area is designated as a detailed ROI corresponding to 10% of the lateral width and 30% of the vertical width on the basis of the dead center of the face area.

I-4. Face Feature Extraction (Step S34)

As shown in (C) of FIG. 4, the ROIs for the forehead and the nose are divided into the prescribed number of grids and the center coordinates of each of the grids are extracted. For example, the ROI for the forehead is divided into 16×2 grids, the ROI for the nose is divided into 2×8 grids, and the center coordinates of each of the grids are extracted.

I-5. Facial Feature Tracking (step S35)

A ballistocardiographic head movement caused by heart beat is represented as a tremor in a vertical direction to the ground surface. Accordingly, a change in Y-coordinate in each facial landmark is tracked for each frame, and, here, a Kanade-Lucas-Tomasi (KLT) tracker algorithm may be applied to the coordinate tracking. In the present embodiment, the KLT algorithm is applied to consecutive frames, a value of a change in Y-coordinate is tracked in the current frame in comparison to the previous frame for the center coordinates of each grid, and then a movement change amount of the landmark is extracted between frames as a landmark movement signal (namely, data) generated as a periodic tremor caused by the heartbeat. For example, a sliding window technique may be adopted in the extraction of the movement change amount of the landmark, and a window size and an interval size of which may be set to 30 s and 1 s, respectively.

I-6. MMD Extraction (Step S36)

This process is to remove macro-movements, other than the micro-movements caused by a conscious movement and the heart beat, from the landmark movement data. In the process, performed are signal filtering for extracting only an effective signal and a principal component analysis (PCA) technique for extracting a principal component corresponding to a pulse.

I-6-1. Signal Filtering

In order to detect only the micro-movements in a band of about 45 to about 150 bpm, which are generated by a heart-related component, from the movement change amount of the landmark that is a raw signal showing the movements of the facial landmark tracked for each frame, a band pass filter (BPF), for example, a fifth order Butterworth BPF (about 0.75 to about 2.5 Hz) is used for extracting only a component of the band of about 0.75 Hz (about 45 bpm) to about 2.5 Hz (about 150 bpm), which corresponds to the heart-rate band.

I-6-2. Principal Component Analysis (PCA)

Since a landmark movement signal (data) is detected according to a movement change between face frames for each of 48 landmarks, a principal component signal having the highest periodicity is detected and selected as a representative signal for extracting the MMD.

Through the PCA, a plurality of components are first extracted, and then a component showing the highest periodicity is extracted as final facial MMD. The periodicity is calculated as the following Equations.

$$ps_s = FFT(s) \qquad \text{[Equation 1]}$$

where s denotes a time-series signal, FFT denotes a Fourier analysis method for transforming the time-series signal into a signal in the frequency domain, and ps denotes a power spectrum in the frequency domain for the time-series signal s.

$$\text{Max Power}_s = \max(ps_s) \qquad \text{[Equation 2]}$$

where Max Power the greatest power value in the entire power spectrum.

$$\text{Total Power}_s = \Sigma ps_s \qquad \text{[Equation 3]}$$

where Total Power denotes the sum of the entire power spectrum.

Finally, the periodicity of the time-series signal s is calculated as the following.

$$\text{Periodicity}_s = (\text{Max Power}_s)/(\text{Total Power}_s) \qquad \text{[Equation 4]}$$

Finally, the Periodicity (namely, the heart rate) for the heart reaction is analyzed from the micro-movements of the faces of the character and the viewer through the aforementioned processes, and the MMD is extracted therefrom.

II. Similarity Calculation of MMD

Figure 5:
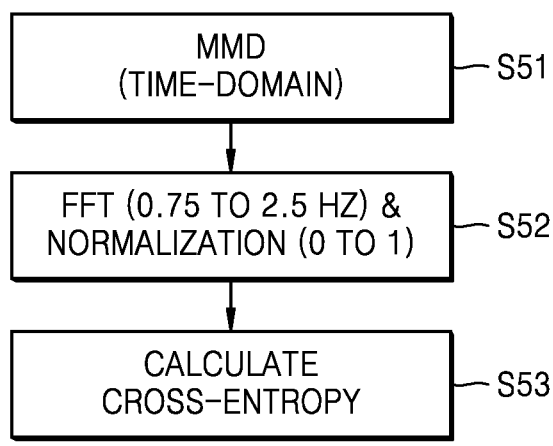
FIG. 5 is a flowchart showing a process for calculating similarity using the MMD in the method for evaluating advertising effects of video content according to one or more embodiments.
Figure 6:
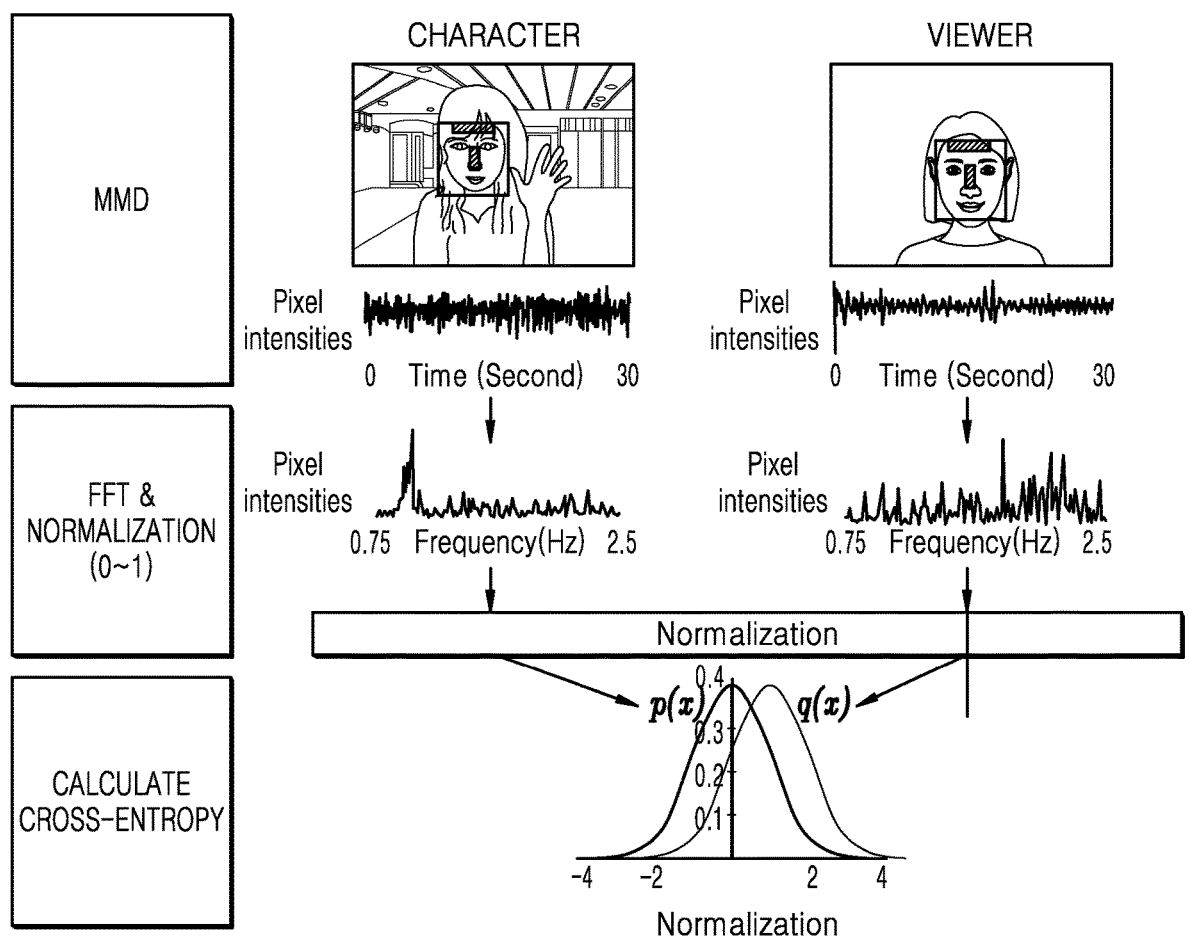
FIG. 6 is a flowchart in which the process shown in FIG. 5 is visualized with face images and graphs.
Figure 7:
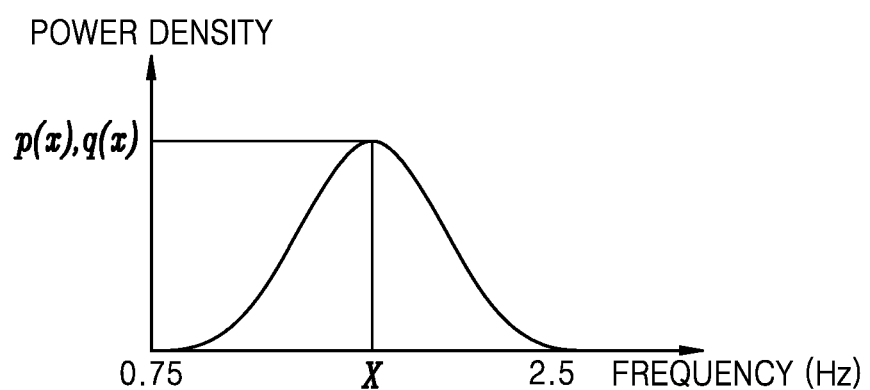
FIG. 7 is a characteristic graph of power spectral density (PSD) of the MMD obtained by FFT processing in the method for evaluating advertising effects of video content according to one or more embodiments.

FIG. 5 illustrates a process for evaluating the similarity of the facial micro-movements of the character and the viewer using time-series MMD, and FIG. 6 is a diagram illustrating the similarity calculation process of FIG. 5. In addition, FIG. 7 is an example of a distribution graph of a power spectral density (PSD) obtained by a fast Fourier transform (FFT).

The extracted MMD is transformed to a PDS signal in a band of about 0.75 Hz to about 2.5 Hz in the frequency domain by the FFT. In addition, the more similar two probability distributions are, the cross-entropy approaches 0, and the more different two probability distributions are, the cross-entropy diverges to the infinity.

In one embodiment of a method for evaluating advertising effects according to the disclosure, a step for calculating a similarity of the MMD of the viewer and the MMD of the character includes:
  a step for calculating PSDs through FFT analysis for the respective MMDs;
  a step for normalizing each of the PSDs;
  a step for calculating cross-entropy for the normalized PSDs; and
  a step for calculating the similarity of the MMDs of the character and the viewer through the cross-entropy.

Specifically, the MMDs of the character in video content and the viewer are acquired (step S51), and each of the PSDs is calculated by the FFT analysis therefor (step S52). Furthermore, each of PSDs is normalized, and then the cross-entropy value is calculated between the two MMDs to analyze the similarity of two pieces of data (step S53).

The more the distributions and the phases of two frequency signals are, the cross-entropy approaches 0, and the more different the two frequency signals are, the cross-entropy value becomes greater. Accordingly, the closer to 0 the cross entropy H(p, q) for the MMDs of the character and the viewer is, the similarity thereof becomes high (see Weifeng et al., 2006), and a calculation equation for the cross-entropy is as the following Equation.

$$H(p, q) = -\sum_x p(x) \log q(x) \qquad \text{[Equation 5]}$$
$$= -(p(x) \cdot \log q(x) + (1 - p(x)) \cdot \log(1 - q(x)))$$

where p denotes the PSD of the character, q denotes the PSD of the viewer, p(x) denotes a value of the amplitude at frequency "x" (Hz) in the PSD of the character, q(x) denotes a value of the amplitude at frequency "x" (Hz) in the PSD of the viewer, and x (frequency tick) denotes a specific frequency within a frequency range of about 0.75 Hz to about 2.5 Hz. In addition, the distance of frequency (df) of x is calculated by dividing a frame per second (fs) of the video by the entire length (second) of the video as the following equation.

$$df = \frac{\text{frame per second}(fs)}{\text{length of content(time)}} \qquad \text{[Equation 6]}$$

III. Quantitative Recognition of Advertising Effects

The reference for evaluating the advertising effects may have 5 items such as ① advertising attitude, ② product attitude, ③ brand attitude, ④ word-of-mouth (WOM) intention, and ⑤ purchase intention.

III-1. Advertising Attitude

The advertising attitude is measured by receiving a response from a user to a question of "very positive to this video" in 5-point scale from 1 point for 'very untrue' to 5 points for 'very true'.

III-2. Product Attitude

The product attitude is measured by receiving a response from a user to a question of "I like the product shown in the video" in 5-point scale from 1 point for 'very untrue' to 5 points for 'very true'.

III-3. Brand Attitude

The brand attitude is measured by receiving a response from a user to a question of "I like the trademark (brand) shown in the video" in 5-point scale from 1 point for 'very untrue' to 5 points for 'very true'.

III-4. WOM Intention

The WOM intention is measured by receiving a response from a user to a question of "I am willing to press 'like' to this advertisement" in 5-point scale from 1 point for 'very untrue' to 5 points for 'very true'.

III-5. Purchase Intention

The purchase intention is measured by receiving a response from a user to a question of "I am led to buy the product in the video" in 5-point scale from 1 point for 'very untrue' to 5 points for 'very true'.

The values of the aforementioned five measurement items are used for evaluating how accurate each advertising effect score (y') is, which is predicted with the micro-movement similarity (namely, the cross-entropy), through the actual responses from the user with respect to the advertising effects. The advertising effect score y' may be predicted with the following regression equation.

$$y' = a \times x + \bar{y} - \bar{x}a \qquad \text{[Equation 7]}$$

$$a = \frac{n\sum xy - \sum x \sum y}{n\sum x^2 - (\sum x)^2}$$

where x denotes the similarity of MMD, y denotes the subjective evaluation score, n denotes the number of subjective evaluation people, $\bar{x}$ is an average of x, and $\bar{y}$ is an average of y.

The following is a regression equation according to subjective evaluations conducted by 30 experimenters. At the time of the subjective evaluation, an advertising video has been presented to the experimenters, pieces of the facial MMD of the character in the advertising video and the experimenters who watch the video have been extracted to calculate the similarity, and then, the advertising effect scores have been calculated for the advertising attitude, the product attitude, the brand attitude, the WOM intention, and the purchase intention.

Advertising attitude=−1230.612×cross-entropy+9.258

Product attitude=−1213.926×cross-entropy+9.05

Brand attitude=−1564.551×cross-entropy+9.087

WOM intention=−597.3×cross-entropy+6.603

Purchase intention=−1165.719×cross-entropy+8.228

The prediction accuracy of each advertising effect may be calculated by subtracting a mean absolute percentage error from 100% of each of the advertising attitude, the product attitude, the brand attitude, the WOM intention, and the purchase intention.

$$MAPE\,(\%) = \frac{100}{n}\sum_{x=1}^{n}\left|\frac{A_x - F_x}{A_x}\right|$$ [Equation 8]

where $A_x$ denotes a subjective evaluation score, $F_x$ denotes a prediction value, and n denotes the total number of samples (number of people*number of videos).

While the disclosure has been particularly shown and described with reference to example embodiments thereof, those skilled in the art will appreciate that various changes in form and details may be made therein without departing from the spirit and scope of the following claims. Therefore, changes in the future embodiments of the present invention will not be able to escape the technology of the present invention.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method for evaluating advertising effects, the method comprising:
   presenting video content comprising a character to a viewer through a display;
   extracting pieces of facial micro-movement data (MMD) of the character in the video content and the viewer, while the viewer watches the video content;
   calculating a similarity of the MMD of the character and the MMD of the viewer; and
   calculating an advertising effect score of the video content on the basis of the similarity.

2. The method according to claim 1, wherein the extracting of the pieces of facial MMD comprises:
   detecting face areas of the character and the viewer respectively from the video content and a face image of the viewer;
   selecting, from the face areas, regions of interest (ROI) from which facial micro-movements are to be extracted;
   extracting a plurality of landmarks from the ROI;
   extracting an amount of change in movement of a feature unit while tracking movements of the landmarks; and
   calculating the facial MMD having representative periodicity from the amount of change in the movements of the landmarks.

3. The method according to claim 2, wherein the ROI is defined as at least one between a nose area and a forehead area of a face.

4. The method according to claim 2, wherein a Kanade-Lucas-Tomasi (KLT) tracking algorithm is applied to the tracking of the landmarks to calculate the amount of change in the movements of the landmarks.

5. The method according to claim 4, wherein, in order to extract unconscious micro expression data from the amount of movement change, the micro expression data is filtered at a prescribed frequency, and MMD is extracted which expresses periodicity of a heart rate through principal component analysis (PCA) to the filtered amount of movement change.

6. The method according to claim 1, wherein the calculating of the similarity further comprises a preprocessing step for filtering the MMD with a band pass filter in frequencies about 0.75 Hz to about 2.5 Hz.

7. The method according to claim 6,
   wherein the pieces of MMD of the character and viewer are transformed to time-series power spectral densities (PSDs) of the character and the viewer through fast Fourier transform (FFT), and
   the similarity of the character's MMD and the viewer's MMD is calculated by cross-entropy H(p, q) defined as the following equation $$H(p, q) = -\sum_x p(x)\log q(x)$$ [Equation]
$$= -(p(x)\cdot\log q(x) + (1 - p(x))\cdot\log(1 - q(x)))$$

where p denotes the PSD of the character,
q denotes the PSD of the viewer,
p(x) denotes a value of an amplitude at frequency "x" (Hz) in the character's PSD, and
q(x) denotes a value of an amplitude at frequency "x" (Hz) in the viewer's PSD.

8. The method according to claim 7,
wherein subject evaluation of the viewer is performed on the video content to calculate a subjective evaluation score of the viewer, and
the advertising effect score y' is calculated with the following equation $$y' = a\times x + \bar{y} - \bar{x}a$$
$$a = \frac{n\sum xy - \sum x\sum y}{n\sum x^2 - \left(\sum x\right)^2}$$

where x denotes the similarity of MMD,
y denotes the subjective evaluation score,
n denotes the number of subjective evaluation people,
$\bar{x}$ denotes an average of x, and
$\bar{y}$ denotes an average of y.

9. The method according to claim 2,
   wherein the pieces of MMD of the character and viewer are transformed to time-series power spectral densities (PSDs) of the character and the viewer through fast Fourier transform (FFT), and
   the similarity of the character's MMD and the viewer's MMD is calculated by cross-entropy H(p, q) defined as the following equation $$H(p, q) = -\sum_x p(x)\log q(x)$$ ⟨Equation⟩
$$= -(p(x)\cdot\log q(x) + (1 - p(x))\cdot\log(1 - q(x)))$$

where p denotes the character's PSD,
q denotes the viewer's PSD,
p(x) denotes a value of an amplitude at frequency "x" (Hz) in the character's PSD, and q(x) denotes a value of an amplitude at frequency "x" (Hz) in the viewer's PSD.

10. The method according to claim 9,
wherein subject evaluation of the viewer is performed on the video content to calculate a subjective evaluation score of the viewer, and
the advertising effect score y' is calculated with the following equation $$y' = a \times x + \bar{y} - \bar{x}a$$
$$a = \frac{n\sum xy - \sum x \sum y}{n\sum x^2 - (\sum x)^2}$$

here x denotes the similarity of MMD,
y denotes the subjective evaluation score,
n denotes the number of subjective evaluation people,
$\bar{x}$ is an average of x, and
$\bar{y}$ is an average of y.

11. A system for evaluating advertising effects of video content, the system performing the method according to claim 1 and comprising:
a display configured to display the video content comprising the character to the viewer;
a camera configured to capture a face of the viewer;
an image capturing unit configured to capture the video content;
an image analysis unit configured to extract the face areas of the character and the viewer from the images from the camera and the image capturing unit;
a micro-movement analysis unit configured to extract respective pieces of the facial micro-movement data (MMD) from the face areas of the character and the viewer, and analyze the similarity of the pieces of MMD of the character and the viewer; and
an advertising evaluation unit configured to evaluate advertising effects on the basis of the similarity.

12. The system according to claim 11, wherein the micro-movement analysis unit is configured to filter the MMD with a band pass filter (BPF) in frequencies about 0.75 Hz to about 2.5 Hz in the calculating of the similarity.

13. The system according to claim 12, wherein the micro-movement analysis unit
transforms the pieces of MMD of the character and viewer to time-series power spectral densities (PSDs) of the character and the viewer through fast Fourier transform (FFT), and
calculates the similarity of the character's MMD and the viewer's MMD through cross-entropy H(p, q) defined as the following equation $$H(p, q) = -\sum_x p(x) \log q(x) \qquad \langle\text{Equation}\rangle$$
$$= -(p(x) \cdot \log q(x) + (1 - p(x)) \cdot \log(1 - q(x)))$$

where p denotes the character's PSD,
q denotes the viewer's PSD,
p(x) denotes a value of an amplitude at frequency "x" (Hz) in the character's PSD, and
q(x) denotes a value of an amplitude at frequency "x" (Hz) in the viewer's PSD.

14. The system according to claim 11,
wherein the micro-movement analysis unit
transforms the pieces of MMD of the character and viewer to time-series power spectral densities (PSDs) of the character and the viewer through fast Fourier transform (FFT), and
calculates the similarity of the character's MMD and the viewer's MMD through cross-entropy H(p, q) defined as the following equation $$H(p, q) = -\sum_x p(x) \log q(x) \qquad \langle\text{Equation}\rangle$$
$$= -(p(x) \cdot \log q(x) + (1 - p(x)) \cdot \log(1 - q(x)))$$

where p denotes the character's PSD,
q denotes the viewer's PSD,
p(x) denotes a value of an amplitude at frequency "x" (Hz) in the character's PSD, and
q(x) denotes a value of an amplitude at frequency "x" (Hz) in the viewer's PSD.

15. The system according to claim 14,
wherein the advertising evaluation unit performs subject evaluation of the viewer on the video content to calculate a subjective evaluation score of the viewer, and
the advertising effect score y is calculated with the following equation $$y' = a \times x + \bar{y} - \bar{x}a$$
$$a = \frac{n\sum xy - \sum x \sum y}{n\sum x^2 - (\sum x)^2}$$

where x denotes the similarity of MMD,
y denotes the subjective evaluation score,
n denotes the number of subjective evaluation people,
$\bar{x}$ denotes an average of x, and
$\bar{y}$ denotes an average of y.

16. The system according to claim 13,
wherein the advertising evaluation unit performs subject evaluation of the viewer on the video content to calculate a subjective evaluation score of the viewer, and
the advertising effect score y is calculated with the following equation $$y' = a \times x + \bar{y} - \bar{x}a$$
$$a = \frac{n\sum xy - \sum x \sum y}{n\sum x^2 - (\sum x)^2}$$

where x denotes the similarity of MMD,
y denotes the subjective evaluation score,
n denotes the number of subjective evaluation people,
$\bar{x}$ denotes an average of x, and
$\bar{y}$ denotes an average of y.

17. The system according to claim 11,
wherein the advertising evaluation unit calculates prediction accuracy of advertising effects of the advertising video by subtracting, from 100%, a mean absolute percentage error (MAPE) calculated by the following equation.

18. The method according to claim 3,
wherein the pieces of MMD of the character and viewer are transformed to time-series power spectral densities (PSDs) of the character and the viewer through fast Fourier transform (FFT), and the similarity of the character's MMD and the viewer's MMD is calculated by cross-entropy H(p, q) defined as the following equation $$H(p, q) = -\sum_x p(x) \log q(x) \quad \langle\text{Equation}\rangle$$
$$= -(p(x) \cdot \log q(x) + (1 - p(x)) \cdot \log(1 - q(x)))$$

where p denotes the character's PSD,
q denotes the viewer's PSD,
p(x) denotes a value of an amplitude at frequency "x" (Hz) in the character's PSD, and
q(x) denotes a value of an amplitude at frequency "x" (Hz) in the viewer's PSD.

19. The method according to claim 4,
wherein the pieces of MMD of the character and viewer are transformed to time-series power spectral densities (PSDs) of the character and the viewer through fast Fourier transform (FFT), and the similarity of the character's MMD and the viewer's MMD is calculated by cross-entropy H(p, q) defined as the following equation $$H(p, q) = -\sum_x p(x) \log q(x) \quad \langle\text{Equation}\rangle$$
$$= -(p(x) \cdot \log q(x) + (1 - p(x)) \cdot \log(1 - q(x)))$$

where p denotes the character's PSD,
q denotes the viewer's PSD,
p(x) denotes a value of an amplitude at frequency "x" (Hz) in the character's PSD, and
q(x) denotes a value of an amplitude at frequency "x" (Hz) in the viewer's PSD.

20. The method according to claim 4,
wherein the pieces of MMD of the character and viewer are transformed to time-series power spectral densities (PSDs) of the character and the viewer through fast Fourier transform (FFT), and the similarity of the character's MMD and the viewer's MMD is calculated by cross-entropy H(p, q) defined as the following equation $$H(p, q) = -\sum_x p(x) \log q(x) \quad \langle\text{Equation}\rangle$$
$$= -(p(x) \cdot \log q(x) + (1 - p(x)) \cdot \log(1 - q(x)))$$

where p denotes the character's PSD,
q denotes the viewer's PSD,
p(x) denotes a value of an amplitude at frequency "x" (Hz) in the character's PSD, and
q(x) denotes a value of an amplitude at frequency "x" (Hz) in the viewer's PSD.

* * * * *